J. J. BUCKLEY.
ANTIFRICTION BEARING.
APPLICATION FILED JULY 24, 1911.
1,044,342.
Patented Nov. 12, 1912.
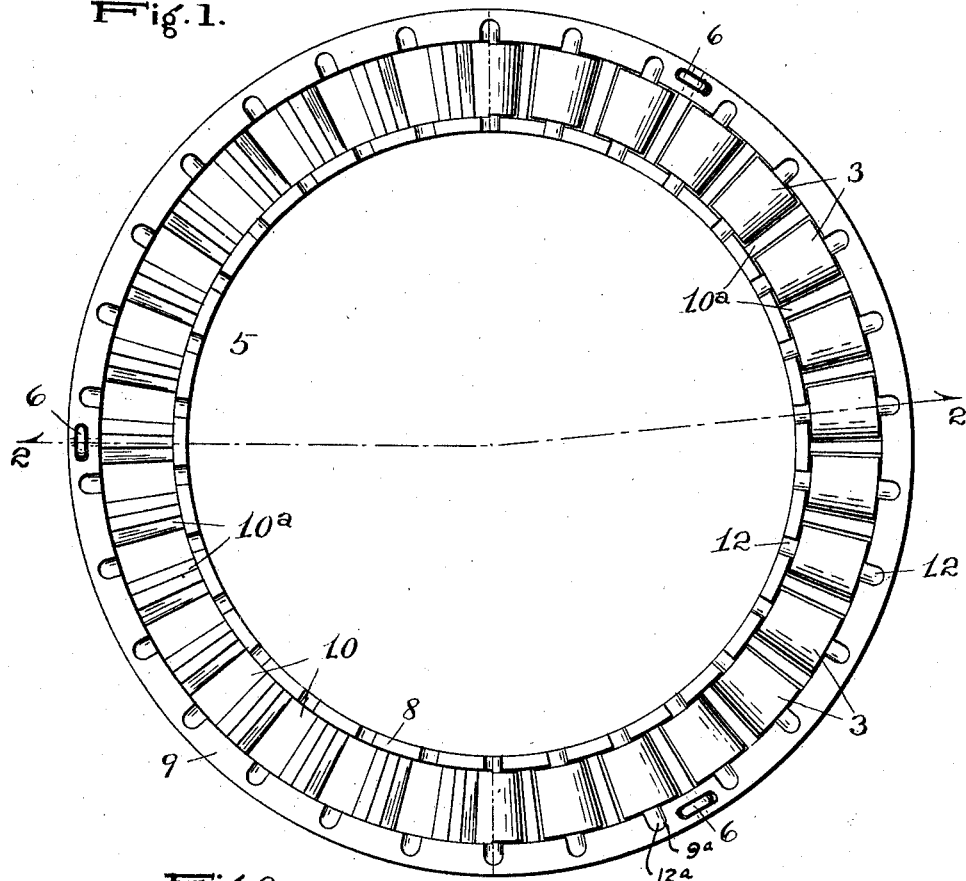
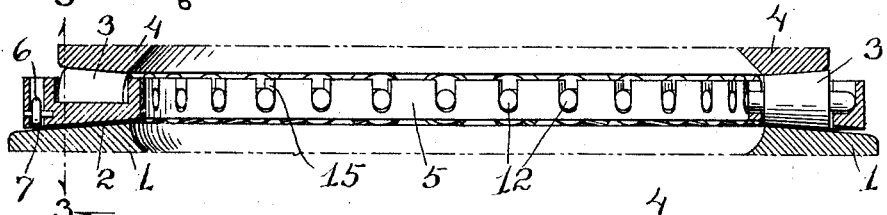
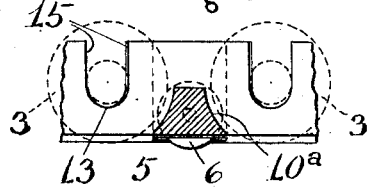
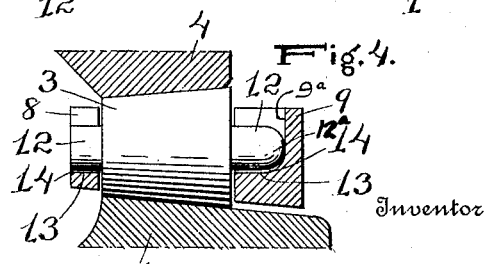
Witnesses
Stuart Hilder.
Frances W. Anderson.
Inventor
James J. Buckley
By E. W. Anderson & Son
Attorneys

UNITED STATES PATENT OFFICE.

JAMES J. BUCKLEY, OF WASHINGTON, DISTRICT OF COLUMBIA.

ANTIFRICTION-BEARING.

1,044,342.  Specification of Letters Patent.  Patented Nov. 12, 1912.

Application filed July 24, 1911.  Serial No. 640,276.

*To all whom it may concern:*

Be it known that I, JAMES J. BUCKLEY, a citizen of the United States, resident of Washington, District of Columbia, have made a certain new and useful Invention in Antifriction-Bearings; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention, showing the load bearing rollers in place in one half of the annulus. Fig. 2 is a section on the line 2—2, Fig. 1 of the invention as applied. Fig. 3 is a section on the line 3—3, Fig. 2, with parts broken away and the load bearing rollers in dotted lines. Fig. 4 is a detail sectional view taken centrally of one of the load bearing rollers.

The invention has relation to anti-friction bearings for use with cranes, derricks, car trucks and other devices, where a weight is supported upon frusto-conical or cylindrical rollers, having for its object to enable the rollers to be readily removed and replaced in position.

Other objects and advantages will hereinafter appear.

The invention consists in the novel construction and combinations of parts, as hereinafter set forth.

In the accompanying drawings, illustrating the invention, the numeral 1 designates the load support or base, having an annular beveled track or raceway 2 for the rollers 3, 3, upon which is borne the load or an intermediate support for the load, marked 4.

5 is an annulus having rollers 6, 6 supporting the same, located preferably outside of the rollers 3, 3 and rolling upon a track or raceway 7 of the support, said annulus being composed preferably of inner and outer rings 8 and 9, separated by an interval 10 within which fit the rollers 3, 3, and connected together in a rigid manner by radial bridge joints 10ª located between the rollers 3, 3. The rollers 3, 3 are held in proper relative position between the ring sections in such a manner that they may be readily removed for renewal, repairs or other purpose, and as readily replaced in position, the support 1 having been previously jacked up away from the rollers to the required extent. In order to accomplish this result, the inner and outer rings 8 and 9 are provided each with open-top seats, within which fit the end journals 12 of the rollers. The outer ring 9 is provided with a wall 9ª, closing in the open-top seats thereof at the outside, and the outer of the roller journals are provided with rounded anti-friction ends 12ª, which in the outward thrust of the rollers take a bearing against said wall, said rounded ends also facilitating the removal of the rollers from their seats.

In assembling the parts, the annulus 5 having the rollers 6, 6 is first placed in position upon the support 1, after which the rollers 3, 3 may be conveniently placed in position with the end journals thereof in their open-top seats, or these rollers may be first engaged with their seats and the annulus then placed in position upon the support. The load 4 is then let down upon the rollers, and the device is complete.

In order that the weight of the load may always be borne upon the rollers 3, 3 and never upon the rollers 6, these rollers 3, 3 have their end journals 12 located slightly above and clearing the bottoms 13 of their seats by intervals 14, said journals turning between and having lateral contact with the side walls 15 of said seats.

The invention is conveniently assembled and as readily dismantled, and is designed to effect a great saving of time and labor.

Having thus described my invention, what I claim as new and desire to secure by Letters Patent is:

In a device of the class described, a base having a beveled annular track, an outer ring having a series of open-top recess-seats having outer end walls, and a series of open-end vertical slots, a support for the load having a diameter less than that of said outer ring to leave said seats and said slots exposed, an inner ring having a series of open-top recess-seats and rigid connection with said outer ring, bearing rollers supporting said rings above said base, pivoted in said vertical slots and removable from the open upper ends thereof, a series of frusto-conical load-bearing rollers upon said track and upon which rests said support, said rollers having end journals engaging the recess seats of the rings and being removable with said rollers from the open upper ends of said seats when the support and load is jacked up, the outer of said journals having rounded ends bearing against said outer end walls of the seats of the outer ring to take the thrust and to facilitate the removal.

In testimony whereof I affix my signature, in presence of two witnesses.

JAMES J. BUCKLEY.

Witnesses:
JOANNA L. CURTIN,
RICHARD A. CURTIN.

---

Copies of this patent may be obtained for five cents each, by addressing the "Commissioner of Patents, Washington, D. C."